United States Patent
Tokita et al.

(10) Patent No.: US 8,734,539 B2
(45) Date of Patent: May 27, 2014

(54) METHOD OF MANUFACTURING ACTIVE MATERIAL CONTAINING VANADIUM AND METHOD OF MANUFACTURING LITHIUM-ION SECONDARY BATTERY CONTAINING SUCH ACTIVE MATERIAL

(75) Inventors: Kouji Tokita, Tokyo (JP); Keitaro Otsuki, Tokyo (JP); Atsushi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 610 days.

(21) Appl. No.: 12/887,820

(22) Filed: Sep. 22, 2010

(65) Prior Publication Data

US 2011/0072649 A1    Mar. 31, 2011

(30) Foreign Application Priority Data

Sep. 29, 2009 (JP) ............................... P2009-224789
Sep. 29, 2009 (JP) ............................... P2009-224796
Sep. 15, 2010 (JP) ............................... P2010-207079
Sep. 15, 2010 (JP) ............................... P2010-207083

(51) Int. Cl.
*H01M 4/58* (2010.01)
*C01D 15/00* (2006.01)

(52) U.S. Cl.
USPC .................. 29/623.5; 423/594.15; 423/594.8; 429/231.5; 429/231.95

(58) Field of Classification Search
None
See application file for complete search history.

(56) References Cited

U.S. PATENT DOCUMENTS 6,528,033 B1   3/2003 Barker et al.
6,702,961 B2   3/2004 Barker et al.

(Continued)

FOREIGN PATENT DOCUMENTS

JP  2003-068304  *  3/2003  .............. H01M 4/58
JP  A-2003-520405    7/2003

OTHER PUBLICATIONS

Barker et al., Electrochemical Properties of Beta-LiVOPO$_4$ Prepared by Carbothermal Reduction, *Journal of the Electrochemical Society*, 2004, p. A796-p. A800, 151(6).

(Continued)

*Primary Examiner* — Ula C Ruddock
*Assistant Examiner* — Tony Chuo
(74) *Attorney, Agent, or Firm* — Oliff PLC (57) ABSTRACT

The first aspect of the present invention provides a method of manufacturing an active material capable of improving the discharge capacity of a lithium-ion secondary battery. The method of manufacturing an active material in accordance with the first aspect of the present invention comprises the steps of heating a phosphate source, a vanadium source, and water so as to form an intermediate containing phosphorus and vanadium and having a specific surface area of at least 0.1 m$^2$/g but less than 25 m$^2$/g; and heating the intermediate, a water-soluble lithium salt, and water. The second aspect of the present invention provides a method of manufacturing an active material capable of improving the rate characteristic of a lithium-ion secondary battery. The method of manufacturing an active material in accordance with the second aspect of the present invention comprises the steps of heating a phosphate source, a vanadium source, a water-soluble organic compound, and water for 1 to 12 hr so as to form an intermediate; and heating the intermediate, a lithium salt, and water.

7 Claims, 1 Drawing Sheet

(56) References Cited

U.S. PATENT DOCUMENTS

| | | |
|---|---|---|
| 6,716,372 B2 | 4/2004 | Barker et al. |
| 6,730,281 B2 | 5/2004 | Barker et al. |
| 7,060,206 B2 | 6/2006 | Barker et al. |
| 7,276,218 B2 | 10/2007 | Barker et al. |
| 7,550,098 B2 | 6/2009 | Barker et al. |
| 2005/0255026 A1 | 11/2005 | Barker et al. |
| 2007/0001153 A1 | 1/2007 | Barker et al. |
| 2008/0020277 A1 | 1/2008 | Barker et al. |
| 2009/0035661 A1* | 2/2009 | Swoyer et al. ............ 429/231.5 |
| 2010/0081058 A1* | 4/2010 | Sano et al. ................. 429/231.5 |
| 2010/0233545 A1* | 9/2010 | Sano et al. ................. 429/231.5 |

OTHER PUBLICATIONS

Azmi et al., Cathodic Performance of $LiVOPO_4$ Prepared by Impregnation Method for Li Ion Secondary Battery, *Electrochemistry*, 2003, p. 1108-p. 1110, 71 No. 12.

Jacobson et al., "Redox Intercalation Reactions of $VOPO_4 \cdot 2H_2O$ with Mono- and Divalent Cations," Inorganic Chemistry, vol. 24, No. 12, 1985, American Chemical Society, pp. 1782-1787.

* cited by examiner

METHOD OF MANUFACTURING ACTIVE MATERIAL CONTAINING VANADIUM AND METHOD OF MANUFACTURING LITHIUM-ION SECONDARY BATTERY CONTAINING SUCH ACTIVE MATERIAL

BACKGROUND OF THE INVENTION

1. Field of the Invention

The present invention relates to a method of manufacturing an active material and a method of manufacturing a lithium-ion secondary battery.

2. Related Background Art $LiCoO_2$ has widely been in use as a positive electrode active material for lithium-ion secondary batteries. However, it has been pointed out that $LiCoO_2$ incurs high material cost and low thermal stability which is problematic in terms of safety. As positive electrode active materials which overcome these problems, phosphate-based positive electrode active materials such as $LiFePO_4$ and $LiVOPO_4$ have been attracting attention. Among the phosphate-based positive electrode active materials, $LiVOPO_4$ has been known as a compound which can achieve a 4-V class charge/discharge voltage (see Japanese Translated International Patent Application Laid-Open NO. 2003-520405, Journal of The Electrochemical Society, 151(6) A794-A800 (2004), and Electrochemistry, 71 No. 12 (2003), 1108-1110).

SUMMARY OF THE INVENTION $LiVOPO_4$ has been known to exhibit a plurality of crystal structures such as triclinic (α-type) and orthorhombic (β-type) crystals and have different electrochemical characteristics depending on its crystal structures. The β-type crystal of $LiVOPO_4$ has an ion conduction path (lithium ion path) more linear and shorter than that of the α-type crystal and thus is superior thereto in the characteristic of reversibly inserting and desorbing lithium ions (which will hereinafter be referred to as "reversibility" when appropriate). Therefore, the charge/discharge capacity of batteries using $LiVOPO_4$ tends to increase as the ratio of the β-type crystal in $LiVOPO_4$ is greater. Hence, a method of manufacturing an active material which can yield a single phase of the β-type crystal of $LiVOPO_4$ is desired.

However, the inventors have found a problem that the methods of manufacturing $LiVOPO_4$ described in the above-mentioned literatures are so strict about conditions for obtaining the β-type crystal that it is difficult for them to yield a single phase of the β-type crystal.

First Aspect of Invention

In view of the problems of the prior art mentioned above, it is an object of the first aspect of the present invention to provide a method of manufacturing an active material which can improve the discharge capacity of a lithium-ion secondary battery and a method of manufacturing a lithium-ion secondary battery using the active material.

For achieving the above-mentioned object, the method of manufacturing an active material in accordance with the first aspect of the present invention comprises the steps of heating a phosphate source, a vanadium source, and water so as to form an intermediate containing phosphorus and vanadium and having a specific surface area of at least $0.1\ m^2/g$ but less than $25\ m^2/g$; and heating the intermediate, a water-soluble lithium salt, and water.

This aspect of the present invention can form an active material containing the β-type crystal of $LiVOPO_4$. Lithium-ion secondary batteries including thus obtained active material as a positive electrode active material can improve the discharge capacity as compared with lithium-ion secondary batteries using $LiVOPO_4$ formed by the conventional manufacturing methods. Preferably, the specific surface area of the intermediate is 0.4 to $10\ m^2/g$. This makes it easier to improve the discharge capacity of the lithium-ion secondary battery.

Preferably, in the first aspect of the present invention, the water-soluble lithium salt is at least one kind selected from the group consisting of $LiNO_3$, $LiCl$, and, $LiOH.H_2O$. This tends to improve the discharge capacity of the lithium-ion secondary battery as compared with the cases using other water-soluble salts.

The method of manufacturing a lithium-ion secondary battery in accordance with the first aspect of the present invention comprises the step of forming an electrode having a current collector and an active material layer, disposed on the current collector, containing the active material obtained by the method of manufacturing an active material in accordance with the first aspect of the present invention. This can manufacture a lithium-ion secondary battery having a discharge capacity greater than that of a lithium-ion secondary battery using $LiVOPO_4$ formed by the conventional manufacturing methods.

The first aspect of the present invention can provide a method of manufacturing an active material which can improve the discharge capacity of a lithium-ion secondary battery and a method of manufacturing a lithium-ion secondary battery using the active material.

Second Aspect of Invention

In view of the problems of the prior art mentioned above, it is an object of the second aspect of the present invention to provide a method of manufacturing an active material which can improve the rate characteristic of a lithium-ion secondary battery and a method of manufacturing a lithium-ion secondary battery using the active material.

For achieving the above-mentioned object, the method of manufacturing an active material in accordance with the second aspect of the present invention comprises the steps of heating a phosphate source, a vanadium source, a water-soluble organic compound, and water for 1 to 12 hour so as to form an intermediate; and heating the intermediate, a lithium salt, and water.

The second aspect of the present invention can form an active material containing the β-type crystal of $LiVOPO_4$. Lithium-ion secondary batteries including thus obtained active material as a positive electrode active material can improve the rate characteristic as compared with lithium-ion secondary batteries using $LiVOPO_4$ formed by the conventional manufacturing methods.

In the above-mentioned aspect of the second aspect of the present invention, the water-soluble organic compound may be at least one kind selected from the group consisting of sucrose, glucose, methylcellulose, ethylcellulose, facto-oligosaccharides, and polyvinyl alcohol.

Preferably, in the second aspect of the present invention, the ratio [C]/[V] between the number of moles of carbon [C] contained in the water-soluble organic compound and the number of moles of vanadium [V] contained in the vanadium source is adjusted to 0.01 to 8. More preferably, the ratio [C]/[V] is adjusted to 0.1 to 4. This makes advantageous effects of the second aspect of the present invention remarkable.

The method of manufacturing a lithium-ion secondary battery in accordance with the second aspect of the present invention comprises the step of forming an electrode having a current collector and an active material layer, disposed on the current collector, containing the active material obtained by the method of manufacturing an active material in accordance with the second aspect of the present invention. This can manufacture a lithium-ion secondary battery having a rate characteristic greater than that of a lithium-ion secondary battery using $LiVOPO_4$ formed by the conventional manufacturing methods.

The second aspect of the present invention can provide a method of manufacturing an active material which can improve the rate characteristic of a lithium-ion secondary battery and a method of manufacturing a lithium-ion secondary battery using the active material.

DESCRIPTION OF THE PREFERRED EMBODIMENTS

Preferred Embodiment of First Aspect of Invention

A preferred embodiment of the first aspect of the present invention will be referred to as "first embodiment" in this specification.

Method of Manufacturing Active Material

In the following, methods of manufacturing an active material and a lithium-ion secondary battery in accordance with the first embodiment will be explained in detail.

The method of manufacturing an active material in accordance with the first embodiment comprises the steps of heating a phosphate source, a vanadium source, and water so as to form an intermediate containing phosphorus and vanadium and having a specific surface area of at least $0.1 \text{ m}^2/\text{g}$ but less than $25 \text{ m}^2/\text{g}$; and heating the intermediate, a water-soluble lithium salt, and water. Here, the intermediate is a precursor of $LiVOPO_4$ while being a compound containing no Li. In the following, the step of forming the above-mentioned intermediate will be referred to as first heating step. The step of heating the intermediate, water-soluble lithium salt, and water will be referred to as second heating step.

First Heating Step

The first heating step may prepare a mixed liquid of a phosphate source, a vanadium source, and distilled water by stirring them and heat the mixed liquid. This produces the intermediate in the mixed liquid. The inventors think that heating the mixed liquid generates $VOPO_4 \cdot 2H_2O$, which is a hydrate of the intermediate, in the mixed liquid.

Preferably, the first heating step heats the mixed liquid to 50 to 120° C. That is, it will be preferred if the temperature of a reaction for forming the intermediate from the phosphate source, vanadium source, and distilled water is adjusted so as to fall within the range mentioned above. When the temperature of the mixed liquid is too low, the intermediate tends to be harder to generate than when the temperature falls within the above-mentioned range. When the temperature of the mixed liquid is too high, the particle size of the intermediate tends to become greater so as to deteriorate the reactivity in the second heating step as compared with the case where the temperature falls within the above-mentioned range. By heating the mixed liquid within the above-mentioned temperature range, the first embodiment suppresses the tendencies mentioned above, thereby making it easier for the intermediate to attain the specific surface area of at least $0.1 \text{ m}^2/\text{g}$ but less than $25 \text{ m}^2/\text{g}$. Thus, the specific surface area of the intermediate is controllable by the heating temperature of the mixed liquid in the first heating step. The specific surface area of the intermediate may also be controlled by the heating time for the mixed liquid in the first heating step. The specific surface area of the intermediate is more likely to increase and decrease as the heating time for the mixed liquid is shorter and longer, respectively. The heating time for the mixed liquid in the first heating step is on the order of at least 40 min but not more than 15 hr, for example, though not restricted in particular. The intermediate obtained may be pulverized, so as to adjust its specific surface area. Only a part of the intermediate which has a desirable specific surface area obtained by classifying the intermediate according to particle sizes corresponding to specific surface areas may be used for manufacturing the active material.

The first heating step may prepare the mixed liquid by adding the phosphate source and vanadium source to the distilled water while heating the distilled water within the above-mentioned temperature range. This also produces the intermediate.

At least one kind selected from the group consisting of $H_3PO_4$, $NH_2H_2PO_4$, and $(NH_4)_2HPO_4$, for example, may be used as the phosphate source. Two or more kinds of the phosphate source may be used together. As the vanadium source, $V_2O_5$ or $NH_4VO_3$ may be used, for example. Two or more kinds of the vanadium source may be used together.

The compounding ratio of the phosphate and vanadium sources may be adjusted such that the ratio between the number of moles of elemental phosphorus contained in the phosphate source and the number of moles of elemental vanadium contained in the vanadium source equals their stoichiometric ratio (1:1) in $LiVOPO_4$. It is not always necessary for the compounding ratio between the phosphate and vanadium sources to satisfy the above-mentioned stoichiometric ratio.

When drying the mixed liquid in the first heating step, the mixed liquid before drying preferably contains an organic compound or a carbon material as will be explained later. Examples of the organic compound include sucrose, glucose, fructo-oligosaccharides, polyvinyl alcohol, ascorbic acid, and polyvinylidene fluoride. Examples of the carbon material include graphite and acetylene black. The organic compound may be carbonized by firing, which will be explained later, so as to remain as an impurity in the finally obtained active material and serve as a conductive auxiliary. The carbon material may also function as a conductive auxiliary in the active material.

Preferably, the first heating step dries the mixed liquid after producing the intermediate in the mixed liquid by heating the mixed liquid. The drying further advances the production of the intermediate in the mixed liquid while removing the water content from the mixed liquid, thereby yielding a residue containing the intermediate. This makes it easier for the intermediate to attain the specific surface area of at least $0.1 \text{ m}^2/\text{g}$ but less than $25 \text{ m}^2/\text{g}$. When the mixed liquid contains the above-mentioned organic compound or carbon material, the intermediate is covered with the organic compound or carbon material during the drying. This inhibits the intermediate from growing particles in excess, so as to make it easier for the intermediate to attain the specific surface area of at least $0.1 \text{ m}^2/\text{g}$ but less than $25 \text{ m}^2/\text{g}$. In the following, the residue obtained by the drying in the tint heating step will be referred to as "first residue".

Preferably, the first step dries the mixed liquid in an atmosphere at 150 to 300° C. by using a spray dryer or the like.

When the drying temperature is too low, the drying tends to be less sufficient, so that the first residue is harder to collect, as compared with the case where the temperature falls within the range mentioned above. By drying the mixed liquid within the above-mentioned temperature range, the first embodiment suppresses the tendency mentioned above, so as to make it easier for the intermediate to attain the specific surface area of at least 0.1 m²/g but less than 25 m²/g.

The mixed liquid or first residue containing the intermediate may be fired in the first embodiment. The firing removes water from the mixed liquid or first residue containing the intermediate, so that the intermediate becomes an anhydrate. That is, the inventors think that the firing turns $VOPO_4 \cdot 2H_2O$ into $VOPO_4$. The specific surface area of the intermediate can be evaluated accurately when measured in the anhydrate state. The specific surface area of the intermediate as the anhydrate is at least 0.1 m²/g but less than 25 m²/g, preferably 0.2 to 20 m²/g, more preferably 0.4 to 10 m²/g, most preferably 0.5 to 3 m²/g. Batteries using an active material formed from the intermediate having a specific surface area falling within these ranges yield a remarkably large discharge capacity. The specific surface area of the intermediate may be measured by the BET method. The firing of the mixed liquid or first residue containing the intermediate is not an essential step for obtaining the intermediate, though.

The mixed liquid or first residue containing the intermediate may be fired in an atmosphere at 150 to 450° C. in the first embodiment. When the firing temperature is too low, water tends to be more likely to remain in the intermediate, thereby making it harder to measure the specific surface area of the intermediate and easier for $LiVOPO_4$ to shift its composition. When the firing temperature is too high, the ratio of the β-type crystal phase in $LiVOPO_4$ as the final product tends to decrease because of different phases contained in the intermediate, thereby lowering the battery capacity. These tendencies can be suppressed when the firing temperature in the first heating step falls within the above-mentioned range.

The atmosphere for firing the mixed liquid or first residue containing the intermediate may be any of nitrogen, argon, and air.

Second Heating Step

The second heating step initially adds the intermediate obtained by the first heating step and a water-soluble lithium salt to distilled water and stirs them, so as to prepare a mixed liquid. When preparing the mixed liquid, the temperature of the distilled water may be adjusted to about 30 to 80° C. This promotes the dissolution of the lithium salt into the mixed liquid. The lithium salt content in the mixed liquid may be adjusted as appropriate such that the lithium salt dissolves into the mixed liquid.

The water-soluble lithium salt is a lithium salt whose solubility (concentration) in water at room temperature (20 to 25° C.) is at least 1 mol/L. For example, at least one kind selected from the group consisting of $LiNO_3$, $LiOH \cdot H_2O$, $LiCl$, $LiI$, $Li_2SO_4$, and $CH_3COOLi$ may be used as the water-soluble lithium salt. Advantageous effects of the first aspect of the present invention are hard to attain when water-insoluble lithium salts whose solubility in water is low, such as $LiF$, $Li_2CO_3$, and $Li_3PO_4$, are used.

Preferably, the water-soluble lithium salt is at least one kind selected from the group consisting of $LiNO_3$, $LiCl$, and $LiOH \cdot H_2O$. This tends to improve the discharge capacity of a lithium-ion secondary battery as compared with the cases where other water-soluble lithium salts are used.

The compounding ratio of the water-soluble lithium salt and intermediate may be adjusted such that the ratio among the number of moles of elemental lithium contained in the water-soluble lithium salt, the number of moles of elemental vanadium contained in the intermediate, and the number of moles of elemental phosphorus contained in the intermediate equals their stoichiometric ratio (1:1:1) in $LiVOPO_4$. It is not always necessary for the compounding ratio between the water-soluble lithium salt and the intermediate to satisfy the above-mentioned stoichiometric ratio. For example, a greater amount of the water-soluble lithium salt may be compounded in order to prevent Li from becoming deficient in finally obtained $LiVOPO_4$.

Preferably, the second heating step dries the mixed liquid containing the intermediate, water-soluble lithium, salt, and distilled water with a spray dryer or the like, so as to yield the second residue. This can homogenously disperse fine pieces of the lithium salt about particles of the intermediate. This, the inventors think, makes it easier to yield the β-type crystal phase of $LiVOPO_4$. Preferably, the second heating step dries the mixed liquid containing the water-soluble lithium salt and distilled water in an atmosphere at 150 to 300° C. by using a spray dryer or the like. When the drying temperature is too low, the drying tends to be less sufficient, so that the second residue is harder to collect, as compared with the case where the temperature falls within the range mentioned above. This tendency can be suppressed when the mixed liquid is dried within the above-mentioned temperature range. When filter-dried instead of being dried as mentioned above, the mixed liquid loses elemental lithium, thereby making it harder to yield $LiVOPO_4$.

The second heating step fires the second residue. The second heating step also fires the mixed liquid containing the intermediate, water-soluble lithium salt, and distilled water. The firing can form an active material containing the β-type crystal of $LiVOPO_4$.

Preferably, the second heating step fires the second residue, or the mixed liquid containing the intermediate, water-soluble lithium salt, and distilled water in an atmosphere at 400 to 700° C. When the firing temperature is too low, $LiVOPO_4$ tends to lower its degrees of crystal growth and improvement in capacity density. When the firing temperature is too high, $LiVOPO_4$ tends to grow in excess, thereby increasing its particle size. As a result, lithium tends to retard its diffusion in the active material, thereby lowering the degree of improvement in capacity density of the active material. These tendencies can be suppressed when the firing temperature in the second heating step falls within the range mentioned above.

The firing time in the second heating step may be 3 to 20 hr.

The inventors think that, since $LiVOPO_4$ obtained by the method of manufacturing an active material in accordance with the first embodiment is a single phase of the β-type crystal excellent in reversibility of lithium ions, batteries using the same improve their discharge capacity. In other words, the method of manufacturing an active material in accordance with the first embodiment is deemed to make it possible to attain the β-type crystal of $LiVOPO_4$ with a yield higher than that in the conventional manufacturing methods.

Preferred Embodiment of Second Aspect of Invention

A preferred embodiment of the second aspect of the present invention will be referred to as "second embodiment" in this specification.

Method of Manufacturing Active Material

In the following, the method of manufacturing an active material in accordance with the second embodiment will be explained in detail.

The method of manufacturing an active material in accordance with the second embodiment comprises the steps of heating a phosphate source, a vanadium source, a water-soluble organic compound, and water for 1 to 12 hr so as to form, an intermediate; and heating the intermediate, a lithium salt, and water. Here, the intermediate is a precursor of LiVOPO$_4$ while being a compound containing no Li. In the following, the step of forming the above-mentioned intermediate will be referred to as first heating step. The step of heating the intermediate, lithium source, and water will be referred to as second heating step.

First Heating Step

The first heating step may prepare a mixed liquid of a phosphate source, a vanadium source, a water-soluble organic compound, and distilled water by stirring them and heat the mixed liquid. This produces the intermediate in the mixed liquid. The inventors think that heating the mixed liquid generates VOPO$_4$.2H$_2$O, which is a hydrate of the intermediate, in the mixed liquid.

Preferably, the first heating step heats the mixed liquid to 50 to 120° C. That is, it will be preferred if the temperature of a reaction for forming the intermediate from the phosphate source, vanadium source, water-soluble organic compound, and distilled water is adjusted so as to fall within the range mentioned above. When the temperature of the mixed liquid is too low, the intermediate tends to be harder to generate than when the temperature falls within the above-mentioned range. When the temperature of the mixed liquid is too high, the particle size of the intermediate tends to become greater so as to deteriorate the reactivity in the second heating step as compared with the case where the temperature falls within the above-mentioned range. By heating the mixed liquid within the above-mentioned temperature range, the second embodiment suppresses the tendencies mentioned above. The first heating step heats the mixed liquid for 1 to 12 hr. When the heating time for the mixed liquid is on the outside of the range of 1 to 12 hr, the discharge capacity or rate characteristic tends to deteriorate. When the heating time is too long, the resulting crystal of LiVOPO$_4$ becomes too large, whereby characteristics of batteries using the same deteriorate.

The first heating step may prepare the mixed liquid by adding the phosphate source, vanadium source, and water-soluble organic compound to the distilled water while heating the distilled water within the above-mentioned temperature range for 1 to 12 hr. This also produces the intermediate.

At least one kind selected from the group consisting of H$_3$PO$_4$, NH$_4$H$_2$PO$_4$, and (NH$_4$)$_2$HPO$_4$, for example, may be used as the phosphate source. Two or more kinds of the phosphate source may be used together. As the vanadium source, V$_2$O$_5$ or NH$_4$VO$_3$ may be used, for example. Two or more kinds of the vanadium source may be used together.

The compounding ratio of the phosphate and vanadium sources may be adjusted such that the ratio between the number of moles of elemental phosphorus contained in the phosphate source and the number of moles of elemental vanadium contained in the vanadium source equals their stoichiometric ratio (1:1) in LiVOPO$_4$. It is not always necessary for the compounding ratio between the phosphate and vanadium sources to satisfy the above-mentioned stoichiometric ratio.

Examples of the water-soluble organic compound include water-soluble polymers and sugars such as sucrose, glucose, methylcellulose, ethylcellulose, polyvinyl alcohol, fructo-oligosaccharides, sorbitol, and lactose. As the water-soluble organic compound, one which is solid at room temperature may be used. The organic compound may be carbonized by firing, which will be explained later, so as to remain as an impurity in the finally obtained active material and serve as a conductive auxiliary. The advantageous effects of the second aspect of the present invention are hard to attain when a water-insoluble organic compound such as polyvinylidene fluoride (PVDF) or a carbon material such as graphite or acetylene black is used in place of the water-soluble organic compound.

Preferably, in the first heating step, the ratio [C]/[V] between the number of moles of carbon [C] contained in the water-soluble organic compound and the number of moles of vanadium [V] contained in the vanadium source is adjusted to 0.01 to 8. More preferably, the ratio [C]/[V] is adjusted to 0.1 to 4. When the ratio [C]/[V] is lower than the range mentioned above, the intermediate tends to be hard to be covered with the water-soluble organic compound in a drying step which will be explained later. When the ratio [C]/[V] is higher than the above-mentioned range, the proportion of the organic compound to the active material tends to become so large that the battery capacity tends to decrease.

Preferably, the first heating step dries the mixed liquid by using a spray dryer or the like after producing the intermediate in the mixed liquid by heating the mixed liquid. The drying further advances the production of the intermediate in the mixed liquid while removing the water content from the mixed liquid, thereby yielding a residue containing the intermediate. During the drying, the intermediate is covered with the water-soluble organic compound. This inhibits the intermediate from growing particles in excess. When a water-insoluble organic compound is used, the intermediate is not sufficiently covered therewith. In the following, the residue obtained by the drying in the first heating step will be referred to as "first residue".

Preferably, the first step dries the mixed liquid in an atmosphere at 150 to 300° C. When the drying temperature is too low, the drying tends to be less sufficient, so that the first residue is harder to collect, as compared with the case where the temperature falls within the range mentioned above. By drying the mixed liquid within the above-mentioned temperature range, the second embodiment suppresses the tendency mentioned above. When filter-dried instead of being dried with the spray dryer, the water-soluble organic compound may be eliminated from the mixed liquid without yielding the desirable intermediate, whereby the advantageous effects of the second aspect of the present invention are hard to attain. Freeze dry and the like may be carried out in place of the drying with the spray dryer.

Preferably, the mixed liquid or first residue containing the intermediate is fired in the second embodiment. The firing removes water from the mixed liquid or first residue containing the intermediate, so that the intermediate becomes an anhydrate. That is, the inventors think that VOPO$_4$.2H$_2$O turns into VOPO$_4$. Unless water-soluble organic matters are transformed to poorly soluble ones by firing the mixed liquid or first residue containing the intermediate, the organic matters will dissolve in water in the second heating step. The firing of the mixed liquid or first residue containing the intermediate is not an essential step for obtaining the intermediate, though.

The mixed liquid or first residue containing the intermediate may be fired in an atmosphere at 200 to 500° C. in the second embodiment. When the firing temperature is too low, water tends to be more likely to remain in the intermediate, thereby making it easier for LiVOPO$_4$ to shift its composition. When the firing temperature is too high, the ratio of the β-type crystal phase in LiVOPO$_4$ as the final product tends to decrease because of different phases contained in the intermediate, thereby lowering the battery capacity. These tendencies can be suppressed when the firing temperature in the first heating step falls within the above-mentioned ranges.

Preferably, the atmosphere for firing the mixed liquid or first residue containing the intermediate is an inert atmosphere such as that of nitrogen or argon.

Second Heating Step

The second heating step initially adds the intermediate obtained by the first heating step and a lithium salt to distilled water and stirs them, so as to prepare a mixed liquid. When preparing the mixed liquid, the temperature of the distilled water may be adjusted to about 30 to 80° C. This promotes the dissolution of the lithium salt into the mixed liquid.

For example, at least one kind selected from the group consisting of $Li_2CO_3$, LiF, $LiNO_3$, LiOH, LiCl, LiBr, LiI, $Li_2SO_4$, $Li_3PO_4$, and $CH_3COOLi$ may be used as the water-soluble lithium salt.

The compounding ratio of the water-soluble lithium salt and intermediate may be adjusted such that the ratio among the number of moles of elemental lithium contained in the lithium salt, the number of moles of elemental vanadium contained in the intermediate, and the number of moles of elemental phosphorus contained in the intermediate equals their stoichiometric ratio (1:1:1) in $LiVOPO_4$. It is not always necessary for the compounding ratio between the lithium salt and the intermediate to satisfy the above-mentioned stoichiometric ratio. For example, a greater amount of the lithium salt may be compounded in order to prevent Li from becoming deficient in finally obtained $LiVOPO_4$.

Preferably, the second heating step dries the mixed liquid containing the intermediate, lithium salt, and distilled water with a spray dryer or the like, so as to yield the second residue. This can inhibit $LiVOPO_4$ from shifting its composition and keep the battery capacity from decreasing. Preferably, the second heating step dries the mixed liquid containing the lithium salt and distilled water in an atmosphere at 150 to 300° C. When the drying temperature is too low, the drying tends to be less sufficient, so that the second residue is harder to collect, as compared with the case where the temperature falls within the range mentioned above. This tendency can be suppressed when the mixed liquid is dried within the above-mentioned temperature range. When filter-dried instead of being dried with the spray dryer, the mixed liquid loses elemental lithium, thereby making it harder to yield $LiVOPO_4$.

The second heating step fires the second residue. The second heating step also fires the mixed liquid containing the intermediate, lithium salt, and distilled water. The firing can form an active material containing the β-type crystal of $LiVOPO_4$.

Preferably, the second heating step fires the second residue, or the mixed liquid containing the intermediate, lithium salt, and distilled water in an atmosphere at 400 to 700° C. When the firing temperature is too low, $LiVOPO_4$ tends to lower its degrees of crystal growth and improvement in capacity density. When the firing temperature is too high, $LiVOPO_4$ tends to grow in excess, so as to increase its particle size, thereby lowering the diffusibility of Li in the crystal. Therefore, batteries using thus obtained $LiVOPO_4$ tend to lower their degree of improvement in rate characteristic. These tendencies can be suppressed when the firing temperature in the second heating step falls within the range mentioned above.

The firing time in the second heating step may be 3 to 20 hr. The firing atmosphere may be any of nitrogen, argon, and Air.

The inventors think that, since $LiVOPO_4$ obtained by the method of manufacturing an active material in accordance with the second embodiment is a single phase of the β-type crystal excellent in reversibility of lithium ions, batteries using the same improve their rate characteristic. In other words, the method of manufacturing an active material in accordance with the second embodiment is deemed to make it possible to attain the β-type crystal of $LiVOPO_4$ with a yield higher than that in the conventional manufacturing methods. If an intermediate is formed by heating a phosphate source, a vanadium source, and water without using a water-soluble organic compound, and then the intermediate, a water-soluble organic compound, a lithium salt, and water are heated, the β-type crystal will be harder to produce, thereby making it difficult for the advantageous effects of the second aspect of the present invention to attain.

Method of Manufacturing Lithium-Ion Secondary Battery

Figure 1:
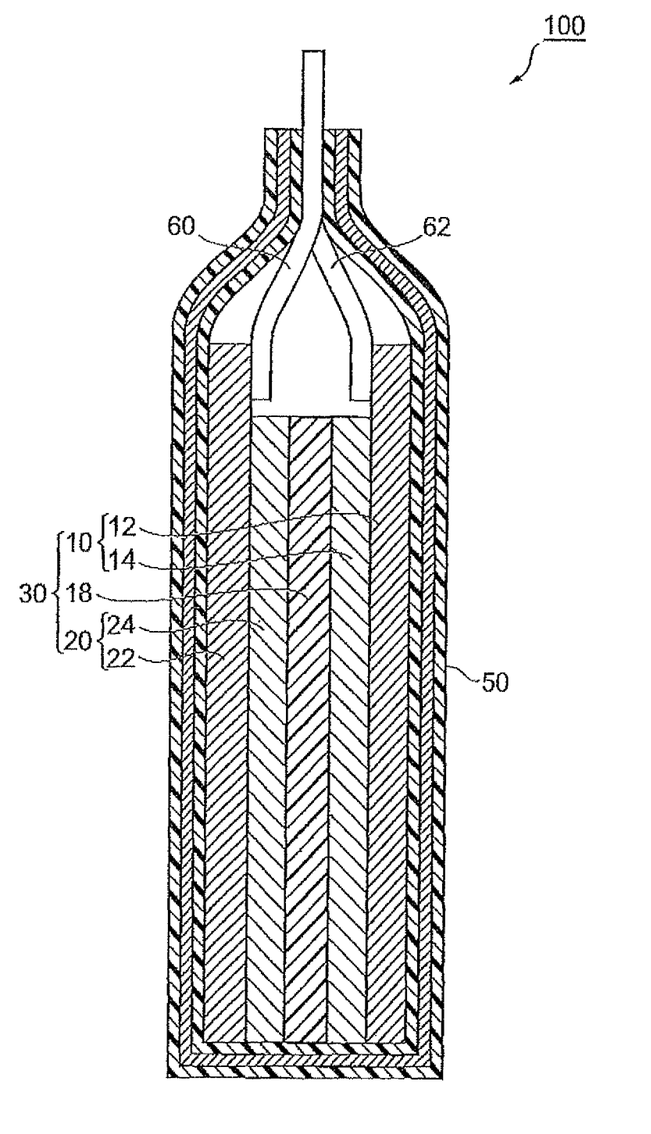
FIG. 1 is a schematic sectional view of a lithium-ion secondary battery in accordance with embodiments of the first and second aspects of present invention.

As illustrated in FIG. 1, a positive electrode active material layer 14 containing the active material obtained by the manufacturing method in accordance with the first or second embodiments mentioned above and a conductive auxiliary is formed on a positive electrode current collector 12. Thus, a positive electrode 10 comprising the positive electrode current collector 12 and the positive electrode active material layer 14 formed on the positive electrode current collector 12 is produced. A negative electrode active material layer 24 containing a negative electrode active material such as graphite is formed on a negative electrode current collector 22. Thus, a negative electrode 20 comprising the negative electrode current collector 22 and the negative electrode active material layer 24 formed on the negative electrode current collector 22 is produced.

Subsequently, negative and positive electrode leads 60, 62 are electrically connected to the negative and positive electrodes 20, 10, respectively. Thereafter, a separator 18 is disposed between the negative and positive electrodes 20, 10 in contact therewith, so as to form a power generating element 30. Here, the surface of the negative electrode 20 on the negative electrode active material layer side and the surface of the positive electrode 10 on the positive electrode active material layer side are arranged in contact with the separator 18.

Next, the power generating element 30 is inserted into a battery case 50, into which an electrolytic solution is injected. Subsequently, while respective leading end portions of the negative and positive electrode leads 60, 62 are placed on the outside of the battery case 50, the opening of the battery case 50 is sealed, whereby a lithium-ion secondary battery 100 is completed.

Though a preferred embodiments of the methods of manufacturing an active material and a lithium-ion secondary battery in accordance with the first and second aspects of the present invention have been explained in detail in the foregoing, the present invention is not limited to the above-mentioned embodiments.

The active material obtained by the manufacturing method in accordance with the present invention can also be used as an electrode material for electrochemical devices other than the lithium-ion secondary battery. Examples of such electrochemical devices include secondary batteries other than the lithium-ion secondary battery, e.g., metallic lithium secondary batteries, and electrochemical capacitors such as lithium capacitors. These electrochemical devices can be used for power supplies for self-propelled micromachines, IC cards, and the like and decentralized power supplies placed on or within printed boards.

EXAMPLES OF FIRST ASPECT OF INVENTION

The first aspect of the present invention will now be explained more specifically with reference to examples 1 to 22 and comparative examples 1 to 9, but will not be limited to the following examples 1 to 22.

Example 1

First Heating Step

A mixed liquid was prepared by adding 4.68 g of $NH_4VO_3$ as a vanadium source, 5.28 g of $(NH_4)_2HPO_4$ as a phosphate source, and 1 g of sucrose to 200 ml of ion-exchanged water. The mixed liquid was heated for 5 hr at 80° C. The heated mixed liquid was dried at about 200° C. by spray drying, so as to yield a first residue. The first residue was fired for 16 hr in an argon atmosphere at 450° C., so as to yield an intermediate. When firing the first residue, the temperature of the argon atmosphere was raised to 450° C. in 1 hr. The specific surface area (SSA) of the intermediate measured by the BET method was 1.0 m$^2$/g.

Second Heating Step

A mixed liquid was prepared by adding 100 ml of ion-exchanged water and 2.76 g of $LiNO_3$ as a water-soluble lithium salt to the intermediate and stirring them at 25° C. Subsequently, the mixed liquid containing the intermediate, $LiNO_3$, and ion-exchanged water was dried at about 200° C. by spray drying, so as to yield a powdery second residue. The second residue was fired for 4 hr in the argon atmosphere at 450° C. When firing the second residue, the temperature of the argon atmosphere was raised to 450° C. in 4 hr. Thus, the active material of Example 1 was obtained. As a result of the Rietveld analysis based on the powder X-ray diffractometry (XRD), the active material of Example 1 was found to be a single phase of the β-type crystal, of $LiVOPO_4$.

Examples 2 to 22 and Comparative Examples 1 to 8

In each of Examples 2 to 22 and Comparative Examples 1 to 8, the amount of $NH_4VO_3$ added to 200 ml of ion-exchanged water was 4.68 g. In each of Examples 2 to 22 and Comparative Examples 1 to 7, the amount of $(NH_4)_2HPO_4$ added to 200 ml of ion-exchanged water was 5.28 g. In Comparative Example 8, the amount of $(NH_4)_2HPO_4$ added to 200 ml of ion-exchanged water was 78 g.

In Examples 2 to 22 and Comparative Examples 1 to 8, their corresponding mixed liquids containing ion-exchanged water, $NH_4VO_3$, $(NH_4)_2HPO_4$, and sucrose were heated at the respective temperatures (reaction temperatures) listed in Tables 1 to 3. In Examples 2 to 22 and Comparative Examples 1 to 8, their corresponding mixed liquids containing ion-exchanged water, $NH_4VO_3$, $(NH_4)_2HPO_4$, and sucrose were heated for the respective times (reaction times) listed in Tables 1 to 3. The first heating step in Comparative Example 8 alternately repeated a step of preparing a slurry by adding 200 ml of ion-exchanged water to the spray-dried first residue and a step of collecting the first residue again by filtering the slurry, three times each, so as to wash the first residue. The washed first residue was then fired as in Example 1.

The respective specific surface areas of the intermediates in Examples 2 to 22 and Comparative Examples 1 to 8 measured by the BET method were as listed in Tables 1 to 3.

In Examples 2 to 22 and Comparative Examples 1, 2, and 6, compounds listed in Tables 1 to 3 were used as water-soluble lithium salts. In Comparative Example 3, water-insoluble LiF was used as a lithium salt. In Comparative Example 4, water-insoluble $Li_3PO_4$ was used as a lithium salt. In Comparative Examples 5, 7, and 8, water-insoluble $Li_2CO_1$ was used as a lithium salt.

In Examples 2 to 22 and Comparative Examples 1 to 8, the amounts of lithium salts added to 100 ml of ion-exchanged water were as listed in Tables 1 to 3. In Examples 2 to 16 and Comparative Examples 1, 2, and 6, the water-soluble lithium salts completely dissolved in ion-exchanged water. While 1.04 g of LiF were added in Comparative Example 3, the solubility of LiF in ion-exchanged water was 0.27 g/100 ml. $Li_3PO_4$ used in Comparative Example 3 hardly dissolved in ion-exchanged water. $Li_2CO_3$ used in Comparative Examples 5, 7, and 8 hardly dissolved in ion-exchanged water.

In Examples 2 to 22 and Comparative Examples 1 to 8, the second residue was fired at their corresponding temperatures (firing temperatures) listed in Tables 1 to 3 in the second heating step.

The respective active materials of Examples 2 to 22 and Comparative Examples 1 to 8 were obtained as in Example 1 except for the foregoing matters.

Comparative Example 9

First Heating Step

A mixed liquid was prepared by adding 7.2 g of $V_2O_5$ as a vanadium source and 40.1 g of $H_3PO_4$ as a phosphate source to 200 ml of ion-exchanged water. The mixed liquid was heated for 16 hr at 80° C. The heated mixed liquid was washed three times with 200 ml of cool ion-exchanged water and then with 200 ml of acetone, so as to yield a first residue. The first residue was fired for 16 hr in an air atmosphere at 400° C., so as to yield an intermediate. When firing the first residue, the temperature of the atmosphere was raised to 400° C. in 1 hr. The specific surface area of the intermediate measured by the BET method was 0.08 m$^2$/g.

Second Heating Step

A mixed powder was obtained by adding 2.96 g of $Li_2CO_3$ as a water-insoluble lithium salt and 0.3 g of carbon black to the intermediate and fully mixing them by an automatic mortar. The mixed powder was fired for 4 hr in an argon atmosphere at 450° C. During the firing, the temperature of the argon atmosphere was raised to 450° C. in 4 hr. This yielded the active material of Comparative Example 9.

Measurement of Crystal Structure

As a result of the Rietveld analysis based on the powder X-ray diffractometry (XRD), each of the active materials of Examples 2 to 22 and Comparative Examples 1 to 9 was found to contain a β-type crystal phase of $LiVOPO_4$.

Making of Evaluation Cells

The active material of Example 1 and a mixture of polyvinylidene fluoride (PVDF) as a binder and acetylene black were dispersed in N-methyl-2-pyrrolidone (NMP) acting as a solvent, so as to prepare a slurry. The slurry was prepared such that the active material, acetylene black, and PVDF had a weight ratio of 84:8:8 therein. The slurry was applied onto an aluminum foil acting as a current collector, dried, and then spread under pressure, so as to yield an electrode (positive electrode) formed with an active material layer containing the active material of Example 1.

Subsequently, thus obtained electrode and an Li foil as its counter electrode were laminated with a separator made of a polyethylene microporous film interposed therebetween, so as to yield a multilayer body (matrix). The multilayer body was put into an aluminum laminate pack, into which a 1-M $LiPF_6$ solution was injected as an electrolyte, and then the pack was sealed in vacuum, so as to yield the evaluation cell of Example 1.

The respective evaluation cells singly using the active materials of Examples 2 to 22 and Comparative Examples 1 to 9 were made as with Example 1.

Measurement of Discharge Capacity

Using the evaluation cell of Example 1, its discharge capacity (unit: mAh/g) at a discharge rate of 0.1 C (a current value at which constant-current discharging completed in 10 hr at 25° C.) was measured. Table 1 shows the result of measurement.

The respective discharge capacities of the evaluation cells of Examples 2 to 22 and Comparative Examples 1 to 9 were measured as with Example 1 Tables 1 to 3 list the results.

TABLE 1

| | 1st heating step | | | Li salt | | 2nd heating step | Evaluation cell |
| --- | --- | --- | --- | --- | --- | --- | --- |
| | Reaction temp. (° C.) | Reaction time (hours) | Intermediate SSA (m²/g) | Species | Amount (g) | Firing temp. (° C.) | Discharge capacity (mAh/g) |
| Example 1 | 80 | 5 | 1.0 | LiNO$_3$ | 2.76 | 450 | 127 |
| Example 2 | 80 | 4 | 1.2 | LiNO$_3$ | 2.76 | 450 | 123 |
| Example 3 | 80 | 4 | 1.2 | LiCl | 1.7 | 450 | 111 |
| Example 4 | 80 | 4 | 1.2 | LiOH•H$_2$O | 1.68 | 450 | 108 |
| Example 5 | 95 | 4 | 0.2 | LiNO$_3$ | 2.76 | 450 | 96 |
| Example 6 | 55 | 4 | 24 | LiNO$_3$ | 2.76 | 450 | 80 |
| Example 7 | 100 | 4 | 0.15 | LiNO$_3$ | 2.76 | 450 | 87 |
| Example 8 | 80 | 1 | 13 | LiNO$_3$ | 2.76 | 450 | 95 |
| Example 9 | 80 | 14 | 0.15 | LiNO$_3$ | 2.76 | 450 | 91 |
| Example 10 | 30 | 40(min) | 19 | LiNO$_3$ | 2.76 | 450 | 88 |

TABLE 2

| | 1st heating step | | | Li salt | | 2nd heating step | Evaluation cell |
| --- | --- | --- | --- | --- | --- | --- | --- |
| | Reaction temp. (° C.) | Reaction time (hours) | Intermediate SSA (m²/g) | Species | Amount (g) | Firing temp. (° C.) | Discharge capacity (mAh/g) |
| Example 11 | 80 | 15 | 0.1 | LiNO$_3$ | 2.76 | 450 | 80 |
| Example 12 | 80 | 4 | 1.2 | LiNO$_3$ | 2 76 | 425 | 106 |
| Example 13 | 80 | 4 | 1.2 | LiNO$_3$ | 2.76 | 675 | 109 |
| Example 14 | 80 | 4 | 1.2 | LiNO$_3$ | 2.76 | 375 | 100 |
| Example 15 | 80 | 4 | 1.2 | LiNO$_3$ | 2.76 | 725 | 102 |
| Example 16 | 80 | 10 | 0.4 | LiNO$_3$ | 2.76 | 450 | 103 |
| Example 17 | 80 | 8 | 0.5 | LiNO$_3$ | 2.76 | 450 | 111 |
| Example 18 | 80 | 3 | 3 | LiNO$_3$ | 2.76 | 450 | 114 |
| Example 19 | 80 | 2.5 | 7 | LiNO$_3$ | 2.76 | 450 | 104 |
| Example 20 | 80 | 2 | 10 | LiNO$_3$ | 2.76 | 450 | 100 |
| Example 21 | 80 | 4 | 1.2 | LiNO$_3$ | 2.76 | 400 | 102 |
| Example 22 | 80 | 4 | 1.2 | LiNO$_3$ | 2.76 | 700 | 106 |

TABLE 3

| | 1st heating step | | | Li salt | | 2nd heating step | Evaluation cell |
| --- | --- | --- | --- | --- | --- | --- | --- |
| | Reaction temp. (° C.) | Reaction time (hours) | Intermediate SSA (m²/g) | Species | Amount (g) | Firing temp. (° C.) | Discharge capacity (mAh/g) |
| Comparative Example 1 | 60 | 1 | 25 | LiNO$_3$ | 2.76 | 450 | 58 |
| Comparative Example 2 | 95 | 12 | 0.07 | LiNO$_3$ | 2.76 | 450 | 65 |
| Comparative Example 3 | 80 | 4 | 1.2 | LiF | 1.04 | 450 | 72 |
| Comparative Example 4 | 80 | 4 | 1.2 | Li$_3$PO$_4$ | 1.54 | 450 | 54 |
| Comparative Example 5 | 80 | 4 | 1.2 | Li$_2$CO$_3$ | 1.48 | 450 | 43 |
| Comparative Example 6 | 80 | 16 | 0.08 | LiNO$_3$ | 2.76 | 450 | 71 |
| Comparative Example 7 | 80 | 16 | 0.08 | Li$_2$CO$_3$ | 1.48 | 450 | 22 |
| Comparative Example 8 | 80 | 16 | 0.09 | Li$_2$CO$_3$ | 1.48 | 450 | 28 |
| Comparative Example 9 | 80 | 16 | 0.08 | Li$_2$CO$_3$ | 1.48 | 450 | 35 |

As illustrated in Tables 1 and 2, the specific surface area of the intermediate in each of Examples 1 to 22 was at least 0.1 $m^2/g$ but less than 25 $m^2/g$. Water-soluble lithium salts were used in Examples 1 to 22.

Each of the evaluation cells of Examples 1 to 22 was seen to have a discharge capacity greater than that of any of all the comparative examples. It was also found that superior discharge capacity was obtained when $LiNO_3$ or LiCl was used among water-soluble lithium salts. In particular, each of Examples 1 to 4 and 12 to 22 in which the specific surface area of the intermediate was 0.4 to 10 $m^2/g$ was seen to have a discharge capacity higher than that of any of the remaining Examples 5 to 11.

The evaluation cell of Comparative Example 1, in which the specific surface area of the intermediate was 25 $m^2/g$, using a water-soluble lithium salt was seen to have a discharge capacity lower than that of any of all the examples. Each of the evaluation cells of Comparative Examples 2 and 6, in which the specific surface area of the intermediate was less than 0.1 $m^2/g$, using a water-soluble lithium salt was seen to have a discharge capacity lower than that of any of all the examples.

Each of the evaluation cells of Comparative Examples 3 to 5 and 7 to 9 using a water-insoluble lithium salt was seen to have a discharge capacity lower than that of any of all the examples.

EXAMPLES OF SECOND ASPECT OF INVENTION

The second aspect of the present invention will now be explained more specifically with reference to examples 101 to 141 and comparative examples 101 to 107, but will not be limited to the following examples 101 to 141.

Example 101

First Heating Step

A mixed liquid was prepared by adding 4.68 g of $NH_4VO_3$ as a vanadium source, 5.28 g of $(NH_4)_2HPO_4$ as a phosphate source, and 1 g of sucrose to 200 ml of ion-exchanged water. The ratio [C]/[V] in the mixed liquid was adjusted to 0.90. The mixed liquid was heated for 4 hr at 80° C. The heated mixed liquid was dried at about 200° C. with a spray dryer, so as to yield a first residue. The first residue was fired for 4 hr in an argon atmosphere at 450° C., so as to yield an intermediate. When firing the first residue, the temperature of the argon atmosphere was raised to 450° C. in 1 hr.

Second Heating Step

A mixed liquid was prepared by adding 100 ml of ion-exchanged water and 2.96 g of $Li_2CO_3$ as a lithium salt to the intermediate and stirring them at 25° C. Subsequently, the mixed liquid containing the intermediate, $Li_2CO_3$, and ion-exchanged water was dried at about 200° C. with a spray dryer, so as to yield a powdery second residue. The second residue was fixed for 4 hr in the argon atmosphere at 450° C. When firing the second residue, the temperature of the argon atmosphere was raised to 450° C. in 4 hr. Thus, the active material of Example 101 was obtained. As a result of the Rietveld analysis based on the powder X-ray diffractometry (XRD), the active material of Example 101 was found to be a single phase of the β-type crystal of $LiVOPO_4$.

Examples 102 to 141 and Comparative Examples 101 to 107

In Examples 102 to 141 and Comparative Examples 105 to 107, their corresponding compounds listed in Tables 4 to 6 were used as water-soluble organic compounds. In Comparative Examples 101 and 102, their corresponding carbon materials listed in Table 4 were used instead of the water-soluble organic compound. In Comparative Example 103, the water-insoluble organic compound shown in Table 4 was used instead of the water-soluble organic compound. In Comparative Example 104, none of water-soluble and water-insoluble organic compounds and carbon materials was used.

In Examples 102 to 141 and Comparative Examples 105 to 107, the amounts of water-soluble organic compounds added to 100 ml of ion-exchanged water were as listed in Tables 4 to 6. In Comparative Examples 101 and 102, the amounts of carbon materials added to 100 ml of ion-exchanged water were as listed in Table 4. In Comparative Example 103, the amount of the water-insoluble organic compound added to 100 ml of ion-exchanged water was as shown in Table 4. In Examples 102 to 141 and Comparative Examples 105 to 107, the ratio [C]/[V] was adjusted to their corresponding values listed in Tables 4 to 6. The ratio [C]/[V] in each of Comparative Examples 101 and 102 listed in Table 4 is the ratio between the number of moles of carbon [C] contained in the carbon material and the number of moles of vanadium [V] contained in the vanadium source. The ratio [C]/[V] in Comparative Example 103 shown in Table 4 is the ratio between the number of moles of carbon [C] contained in the water-insoluble organic compound and the number of moles of vanadium [V] contained in the vanadium source.

In Examples 102 to 141 and Comparative Examples 101 to 103 and 105 to 107, the heating time for the mixed liquid in the first heating step was as listed in Tables 4 to 6. The heating time was the shortest and longest in Examples 110 and 111, respectively, among all the examples 101 to 141. The heating time was the shortest and longest in Comparative Examples 106 and 105, respectively, among all the examples 101 to 141 and comparative examples 101 to 107.

The respective active materials of Examples 102 to 141 and Comparative Examples 101 to 107 were obtained as in Example 4 except for the foregoing matters.

Measurement of Crystal Structure

As a result of the Rietveld analysis based on the powder X-ray diffractometry (XRD), each of the active materials of Examples 102 to 141 and Comparative Examples 101 to 107 was found to contain a β-type crystal phase of $LiVOPO_4$.

Making of Evaluation Cells

The active material of Example 101 and a mixture of polyvinylidene fluoride (PVDF) as a binder and acetylene black were dispersed in N-methyl-2-pyrrolidone (NMP) acting as a solvent, so as to prepare a slurry. The slurry was prepared such that the active material, acetylene black, and PVDF had a weight ratio of 90:5:5 therein. The slurry was applied onto an aluminum foil acting as a current collector, dried, and then spread under pressure, so as to yield an electrode (positive electrode) formed with an active material layer containing the active material of Example 101.

Subsequently, thus obtained electrode and art Li foil as its counter electrode were laminated with a separator made of a polyethylene microporous film interposed therebetween, so as to yield a multilayer body (matrix). The multilayer body was put into an aluminum laminate pack, into which a 1-M $LiPF_6$ solution was injected as an electrolyte, and then the pack was sealed in vacuum, so as to yield the evaluation cell of Example 101.

The respective evaluation cells singly using the active materials of Examples 102 to 141 and Comparative Examples 101 to 107 were made as with Example 101.

Measurement of Discharge Capacity

Using the evaluation cell of Example 101, its discharge capacity (unit: mAh/g) at a discharge rate of 0.1 C (a current value at which constant-current discharging completed in 10 hr at 25° C.) was measured. Table 4 shows the result of measurement. Using the evaluation cell of Example 101, its discharge capacity (unit: mAh/g) at a discharge rate of 10 C (a current value at which constant-current discharging completed in 0.1 hr at 25° C.) was also measured.

The discharge capacities of the evaluation cells of Examples 102 to 141 and Comparative Examples 101 to 107 were measured as with Example 101.

Evaluation of Rate Characteristic

The rate characteristic (unit: %) of Example 101 was determined. Here, the rate characteristic is the ratio of the discharge capacity at 10 C when the discharge capacity at 0.1 C is taken as 100%. Table 4 shows the result.

The respective rate characteristics of the evaluation cells of Examples 102 to 141 and Comparative Examples 101 to 107 were measured as with Example 101. Tables 4 to 6 list the results.

The rate characteristic is preferably at least 30%, more preferably at least 40%.

TABLE 4

|  |  |  | Amount | [C]/[V] (mol ratio) | Heating time in 1st heating step | Rate characteristic (10 C/0.1 C) |
|---|---|---|---|---|---|---|
| Example 101 | Water-soluble organic compound | sucrose | 1 g | 0.9 | 4 hr | 60% |
| Example 102 | Water-soluble organic compound | glucose | 1 g | 0.83 | 4 hr | 57% |
| Example 103 | Water-soluble organic compound | carboxymethyl-cellulose sodium | 1 g | 0.88 | 4 hr | 54% |
| Example 104 | Water-soluble organic compound | polyvinyl alcohol | 1 g | 1.14 | 4 hr | 55% |
| Example 105 | Water-soluble organic compound | sucrose | 0.02 g | 0.018 | 4 hr | 49% |
| Example 106 | Water-soluble organic compound | sucrose | 0.005 g | 0.0045 | 4 hr | 31% |
| Example 107 | Water-soluble organic compound | sucrose | 4 g | 3.6 | 4 hr | 51% |
| Example 108 | Water-soluble organic compound | sucrose | 7 g | 6.3 | 4 hr | 46% |
| Example 109 | Water-soluble organic compound | sucrose | 10 g | 9 | 4 hr | 32% |
| Example 110 | Water-soluble organic compound | sucrose | 1 g | 0.9 | 1 hr | 51% |
| Example 111 | Water-soluble organic compound | sucrose | 1 g | 0.9 | 12 hr | 48% |
| Comparative Example 101 | Carbon material | graphite | 1 g | 2.08 | 4 hr | 21% |
| Comparative Example 102 | Carbon material | acetylene black | 1 g | 2.08 | 4 hr | 15% |
| Comparative Example 103 | Water-insoluble organic compound | PVDF | 1 g | 0.78 | 4 hr | 3% |
| Comparative Example 104 | — | — | 0 g | — | 4 hr | 18% |
| Comparative Example 105 | Water-soluble organic compound | sucrose | 1 g | 0.8 | 16 hr | 20% |
| Comparative Example 106 | Water-soluble organic compound | sucrose | 1 g | 0.9 | 30 min | 24% |
| Comparative Example 107 | Water-soluble organic compound | sucrose | 1 g | 0.9 | 14 hr | 22% |

TABLE 5

|  |  |  | Amount | [C]/[V] (mol ratio) | Heating time in 1st heating step | Rate characteristic (10 C/0.1 C) |
|---|---|---|---|---|---|---|
| Example 112 | Water-soluble organic compound | sucrose | 0.011 g | 0.010 | 4 hr | 44% |
| Example 113 | Water-soluble organic compound | sucrose | 0.11 g | 0.10 | 4 hr | 54% |
| Example 114 | Water-soluble organic compound | sucrose | 0.44 g | 0.40 | 4 hr | 58% |
| Example 115 | Water-soluble organic compound | sucrose | 0.78 g | 0.70 | 4 hr | 58% |
| Example 116 | Water-soluble organic compound | sucrose | 8.9 g | 8.0 | 4 hr | 48% |
| Example 117 | Water-soluble organic compound | glucose | 0.048 g | 0.040 | 4 hr | 45% |
| Example 118 | Water-soluble organic compound | glucose | 0.12 g | 0.10 | 4 hr | 52% |

TABLE 5-continued

|  |  |  | Amount | [C]/[V] (mol ratio) | Heating time in 1st heating step | Rate characteristic (10 C/0.1 C) |
|---|---|---|---|---|---|---|
| Example 119 | Water-soluble organic compound | glucose | 2.4 g | 2.0 | 4 hr | 53% |
| Example 120 | Water-soluble organic compound | glucose | 4.8 g | 4.0 | 4 hr | 50% |
| Example 121 | Water-soluble organic compound | glucose | 6.0 g | 5.0 | 4 hr | 44% |
| Example 122 | Water-soluble organic compound | carboxymethyl-cellulose sodium | 0.045 g | 0.040 | 4 hr | 47% |
| Example 123 | Water-soluble organic compound | carboxymethyl-cellulose sodium | 0.11 g | 0.10 | 4 hr | 52% |
| Example 124 | Water-soluble organic compound | carboxymethyl-cellulose sodium | 4.5 g | 4.0 | 4 hr | 50% |
| Example 125 | Water-soluble organic compound | carboxymethyl-cellulose sodium | 5.7 g | 5.0 | 4 hr | 41% |

TABLE 6

|  |  |  | Amount | [C]/[V] (mol ratio) | Heating time in 1st heating step | Rate characteristic (10 C/0.1 C) |
|---|---|---|---|---|---|---|
| Example 126 | Water-soluble organic compound | polyvinyl alcohol | 0.035 g | 0.040 | 4 hr | 44% |
| Example 127 | Water-soluble organic compound | polyvinyl alcohol | 0.088 g | 0.10 | 4 hr | 52% |
| Example 128 | Water-soluble organic compound | polyvinyl alcohol | 3.5 g | 4.0 | 4 hr | 54% |
| Example 129 | Water-soluble organic compound | polyvinyl alcohol | 4.4 g | 5.0 | 4 hr | 42% |
| Example 130 | Water-soluble organic compound | methylcellulose | 0.045 g | 0.040 | 4 hr | 49% |
| Example 131 | Water-soluble organic compound | methylcellulose | 0.11 g | 0.10 | 4 hr | 53% |
| Example 132 | Water-soluble organic compound | methylcellulose | 2.3 g | 2.0 | 4 hr | 53% |
| Example 133 | Water-soluble organic compound | methylcellulose | 4.5 g | 4.0 | 4 hr | 51% |
| Example 134 | Water-soluble organic compound | methylcellulose | 5.7 g | 5.0 | 4 hr | 42% |
| Example 135 | Water-soluble organic compound | ethylcellulose | 0.043 g | 0.040 | 4 hr | 48% |
| Example 136 | Water-soluble organic compound | ethylcellulose | 0.11 g | 0.10 | 4 hr | 50% |
| Example 137 | Water-soluble organic compound | ethylcellulose | 2.2 g | 2.0 | 4 hr | 52% |
| Example 138 | Water-soluble organic compound | ethylcellulose | 4.3 g | 4.0 | 4 hr | 52% |
| Example 139 | Water-soluble organic compound | ethylcellulose | 5.4 g | 5.0 | 4 hr | 41% |
| Example 140 | Water-soluble organic compound | sucrose | 2.2 g | 2.0 | 4 hr | 56% |
| Example 141 | Water-soluble organic compound | sucrose | 4.4 g | 4.0 | 4 hr | 50% |

Each of the evaluation cells of Examples 101 to 141 in which the mixed liquid containing the water-soluble organic compound was heated for 1 to 12 hr was seen to have a rate characteristic of at least 30%.

Each of the evaluation cells of Comparative Examples 101 to 107 was seen to have a rate characteristic of less than 30%.

What is claimed is:

1. A method of manufacturing an active material comprising the steps of:
heating a phosphate source, a vanadium source, and water so as to form, in a mixed liquid, intermediate containing phosphorus and vanadium but not lithium, and having a specific surface area of at least 0.1 m²/g but less than 25 m²/g; and then to dry the mixed liquid; and
after drying the mixed liquid, heating the intermediate, a water-soluble lithium salt, and water;
thereby forming an active material containing a β-type crystal of LiVOPO$_4$.

2. A method of manufacturing an active material according to claim 1, wherein the specific surface area of the intermediate is 0.4 to 10 m²/g.

3. A method of manufacturing an active material according to claim 1, wherein the water-soluble lithium salt is at least one member selected from the group consisting of LiNO$_3$, LiCl, and LiOH.H$_2$O.

4. A method of manufacturing a lithium-ion secondary battery, the method comprising the step of forming an electrode having a current collector and an active material layer, disposed on the current collector, containing the active material obtained by the method of manufacturing an active according to claim 1.

5. A method of manufacturing an active material according to claim 1, wherein the first heating step dries the mixed liquid in an atmosphere at 150° C. to 300° C.

6. A method of manufacturing an active material according to claim 1, wherein, before drying, the mixed liquid contains an organic compound or a carbon material.

7. A method of manufacturing an active material according to claim 1, wherein the water-soluble lithium salt is at least one member selected from the group consisting of $LiNO_3$ and LiCl.

* * * * *